INVENTOR.
LEWIS MARRA.
BY
John A. Young
his ATTORNEY.

United States Patent Office 3,313,189
Patented Apr. 11, 1967

3,313,189
DUAL CARTRIDGE CONSTRUCTION FOR REPAIR PRODUCT
Lewis Marra, 306 Westwood Manor, Butler, Pa. 16001
Filed June 15, 1965, Ser. No. 487,944
6 Claims. (Cl. 81—15.7)
(Filed under Rule 47(b) and 35 U.S.C. 118)

This invention relates to a dual cartridge construction for repair products, and more particularly to a repair tool which is usable for inserting string-type repair material within an injury of a pneumatic pressure-containing body such as a tubeless tire or the like.

In the repair of tubeless tires, there has been developed a new repair product which has been useful for effecting repairs in tubeless tires and other pneumatic-containing bodies. The repair material has been successfully used in the making of hundreds of thousands of repairs in tubeless tires which have traveled millions of miles over highways of various constructions and conditions.

In order to utilize the repair material, which is described in detail in issued United States Patent No. 3,049,164, issued August 14, 1962, and titled, "Puncture Repair Material," there is used a needle to insert the repair material within the injury of the tire, where it is permanently held in place and effects a permanent repair to the injury of the tire completely sealing the injury so that none of the pneumatic pressure can escape from the interior of the tire. The repair procedure is occasionally referred to by those skilled in the art as an "outside-in" repair, meaning that the repair material can be inserted from outside the tire and without demounting the tire from the rim of the wheel.

Various tools have been proposed for making their repair operation, and it is one of the major purposes of the present invention to provide a repair tool which will enable the user to have at all times an idea as to how much repair product is available within the tool for making additional repairs.

The invention further contemplates as an important feature the use of replacement containers or cartridges having a new supply of repair material for servicing the tool. Thus, the tool, during use, employs the repair product and eventually all of the repair product is exhausted at which time replacement cartridges or containers having continuous lengths of the repair material are provided and which are loaded within the tool for re-use of the tool. In this way, a substantial economy is effected by merely replacing containers which fit within the tool instead of providing an entire new tool each time that the supply of repair material is exhausted. It was previously the practice, to coil continuous lengths of repair material within the canister of the tool and then to provide an entirely new tool each time the repair product was used up. In contrast with that arrangement, the present invention contemplates a considerable saving to the user by providing multiple cartridges each having a quantity of repair material therein and these cartridges may be separately replaced, ordered, and used up within the tool, thus insuring a better inventory control for the operator, and a greater economy in use since the same tool may be continuously employed. Moreover, as one cartridge is used up, the second cartridge is brought into play, the user of the tool is aware that the supply of repair material is diminishing, and is made aware of the fact that a replacement supply will become shortly necessary.

Other objects and features of the present invention will become apparent from a consideration of the following description, which proceeds with reference to the accompanying drawings, wherein:

FIGURE 5 is an enlarged isometric view of one of the internal cartridges for containing repair product.

Figures 1, 2, 3, 4:
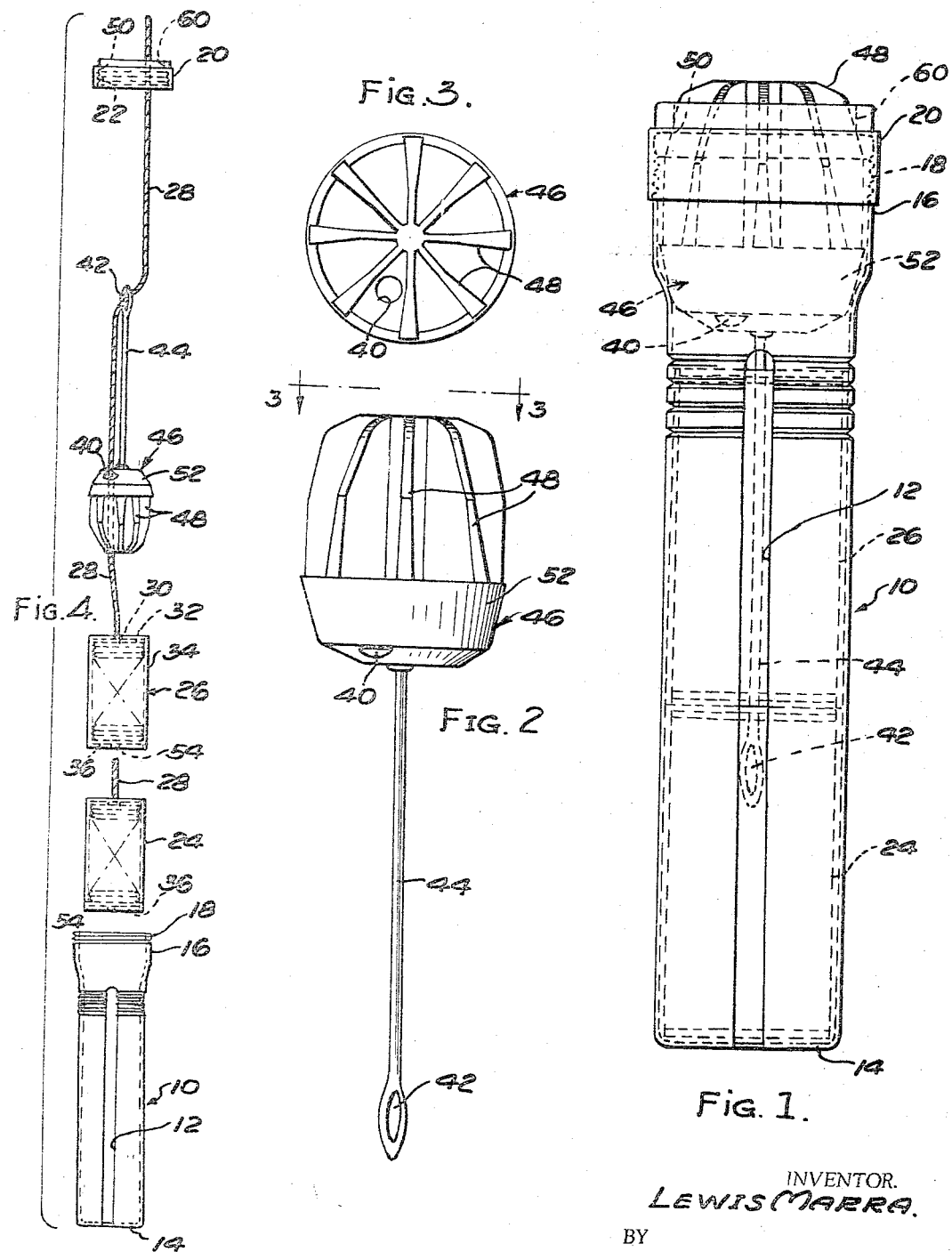
FIGURE 1 is an elevation view of the canister which contains the repair material.
FIGURE 2 is a detail view of the needle-base-and-needle, shown removed from the canister in FIGURE 1.
FIGURE 3 is an end view of the base, looking in the direction of the arrows 3—3 in FIGURE 2.
FIGURE 4 is an exploded view of the canister, interior cartridges, needle base, and end cap and showing the repair material stripped out of the cartridge and threaded through the tool.

Referring now to the drawings, the canister or container designated generally by reference numeral 10 is a chromium plated sheet metal material and has a narrow inspection opening 12 which extends the length of the canister or container 10 to provide an interior view of the canister. In this way, the user can tell at a glance the condition of the supply of repair material within the canister 10. The canister 10 has a base 14 and the opposite end 16 is enlarged and is threaded at 18 to receive a cap 20 of suitable construction such as plastic or the like and which is threaded internally with threads 22 which are screw fitted onto threaded end 18 of the canister 10.

There is received within the canister spaced cartridges 24, 26, which are cylindrical in shape and are proportioned slidably within the canister 10. More than two cartridges can be provided, depending upon design preference, it being found, however, that two cartridges are preferable, one cartridge being in use and the other in standby condition. When the one cartridge is exhausted, it is slipped out and reversed in position with the lower cartridge 24 which is filled with repair material and is ready for use. The repair product is in the form of an elongated cord or string as designated generally by reference numeral 28. The repair material is a knitted sleeve construction of polyethylene, nylon, polypropylene or the like and is filled with a permanently malleable extrudable plastic material such as polysulfide or the like. Details of the composition of this material are found in the Humphreys-Marra Patent No. 3,049,164, previously referenced. The repair material 28 is coiled within each cartridge and is then drawn out of the carriage through an opening 30 of an end plate 32 which is welded or otherwise secured to the cylindrical section 34 having a closed end 36, also with an opening 54 aligned with opening 30. Each cartridge is transparent and is constructed of such material as polyethylene, or the like.

The string material 28, after withdrawal from the cartridge, is drawn through an opening 40 (FIGURE 4) of the needle base 46 and is then passed through eyelet 42 in needle 44, which is mounted in the needle base 46 constructed of phenol formaldehyde resin or the like. The needle base 46 is inserted within the open end of the canister 10 and is press fitted therein, there being a plurality of spaced ribs 48 which are press fitted within the enlarged opening 18 of the canister and engage the inner surfaces to hold the needle base rigidly and without tipping movement. The ribs 48 once being press fitted in place (FIGURE 4) resist turning of the needle movement thereof from side to side. The ribs 48 of the needle base 46 are clamped in place by the end cap 20 which has a shoulder 50 that clamps over conical surface 52 of the needle base and after threadedly joining with the end 18 of the canister 10 forces the needle base into the open end of the canister 10, firmly clamping the needle base in place against further movement.

When the tool is ready for use (FIGURE 4), the needle 44 projects out of the canister, but when the tool is stored, end cap 20 is removed and the needle 44 projects into the canister 10 (FIGURE 1), passing through opening 30 in the end plate 32, through opening 54 in the bottom plate 36 of the cartridge and through opening 30 in the other cartridge 24. There is, of course, also an opening 54 in the cartridge 24 so that the needle can pass through such openings when the cartridges 24 and 26 are reversed.

When the tool is in storage condition and the needle 44 is inserted into the canister 10, the ribs 48 project upwardly (FIGURE 1) through opening 60 of the end cap 20 and the shoulder 50 engages the ribs 48 (FIGURE 1) to clamp the needle base within the open end of the canister 10 holding the needle base in place when the tool is in storage condition and the needle 44 is extended into the canister.

The needle base 46 will retain the cartridges within the canister and the locking ring 20 will retain the parts in this position pending use, at which time the end cap is screwed off and the needle base pulled out of the open end, withdrawing the needle 44 and reversing the needle base from the position (FIGURE 1) and it then projects outwardly (FIGURE 4). Before usage, the repair material is then threaded through the needle 44.

*Operation*

In operation, the repair material 28 is pulled sufficiently out of the uppermost cartridge, either 24 or 26, and the end cap 20 is loosened so that the needle base 46 is raised and the end of the repair material threaded through opening 40 and then through eyelet 42. The cartridges 24 and 26 are fitted into the canister 10 an dthe end 48 of the needle base press fitted into the open end of the canister 10. The end cap 20 is then screw fitted onto the threaded end 18 of the canister 10, and as it is turned down, the shoulder 50 clamps against the conical face 52 and locks the needle base in place. The ribs 48 being press fitted within the open end of the canister 10 are wedged tightly in place and prevent tilting or rocking movement of the needle base 46. The canister 10 then serves as a handle so that the needle 44 can be poked into the injury of the tire, forcing with it a length of the repair material and as the needle 44 is then withdrawn, repair material is left in the injury and effects therein a permanent pneumatic seal. The repair material includes a combination of the knitted sleeve having a substantial tensile strength and resists breaking or pulling apart under tensile load. The permanently extrudable plastic phase of the repair material which is polysulfide, a base material, shapes itself into the irregular voids and crevices of the injury and flows completely throughout the injury effecting therein a permanent seal. After the needle is withdrawn, the repair material is in place, the polysulfide material, being permanently malleable will reform itself into whatever shape is necessary for a complete and adequate repair. The ends of the repair material are then trimmed away and the site is then checked for leakage.

After the repairs are completely performed, the locking ring 20 is loosened and removed and the needle base is withdrawn and reversed, in this case, the needle 44 passing into the interior of the canister, through the aligned openings 30, 54, of the cartridges through a central passage provided by the coiled repair material 28. The conical section 52 is fitted into the open end of the canister and is locked in this position by the lock ring 20 which is threadedly connected to the end of the canister with the shoulder 50 clamping against the ribs 48 (FIGURE 1). The ribs protrude slightly through the opening 60 of the locking ring and the components are held indefinitely within the position shown in FIGURE 1 until the tool is ready for another tire-repairing operation.

The tool, being supplied by two different cartridges, makes it possible to use first one cartridge, and then when it is exhausted, the empty cartridge is reversed in position with the full cartridge, and the repair material is re-threaded through the tool. At this time, the user is aware of the fact that the supply of repair product is about one-half exhausted and the inspection slot 12 in the canister makes it possible to keep a constant tab on the amount of repair material which is remaining. When it is time to reorder the repair product, the same tool is used with replacement cartridges which are ordered in whatever quantity is desired by the user. The closer inspection, the ability to maintain a reliable and constant appraisal of the repair product, makes it possible to reduce inventory, and to order only the exact requirements of the user. It is, of course, possible to maintain one or two cartridges inventory in addition to those which are stored in the canister but even this is not required since pairs of cartridges can be ordered when the one of the cartridges is emptied and is replaced in position with the other, full cartridge. The present invention also has the advantage that instead of ordering a new tool having repair material coiled within the tubular cartridge, the repair material is provided instead in replaceable cartridges which are slip fitted into the cartridge. The empty cartridges can be returned to the supplier for refilling by recoiling repair material therein, or the cartridges can be discarded.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention to suit individual design requirements, and it is intended that such revisions and adaptations will be included within the scope of the following claims as equivalents of the invention.

What is claimed is:

1. A repair tool for inserting outside-in repair material comprising: a canister formed of an elongated tubular container having an elongated slot providing an inspection opening through the length of said canister, at least two transparent storage means proportioned to fit slidably within said canister and having repair material coiled therein, said repair material being in the form of continuous length elongated string-type material which can be drawn continuously from each of said transparent storage means, an elongated needle and needle base proportioned to fit within the end of said canister and reversible whereby the needle can be positioned either interiorly of said canister or project from said canister, means forming a guide opening within said needle base through which the repair material is continuously passed and then threaded through the end of said needle, and a clamping ring threadedly received on the end of said canister to clamp the needle base in position and retain the contents of said canister and position said needle either interiorly of the canister or in a repair-producing position.

2. A repair tool for inserting repair material into pneumatic pressure containing structures such as tires and the like, comprising: an elongated container of hollow construction, at least two storage means proportioned to fit slidably within said container and having continuous length repair material coiled therein, a combination needle-and-needle base which is located at the open end of said canister and reversible whereby said needle is extended interiorly or exteriorly of said canister, means forming a guide within said needle base for withdrawing said repair material and threading it through said needle for insertion during repair operation, and a locking ring for retaining said needle base in the open end of said cannister and thereby retaining the contents of said cannister and positioning said combination needle-and-needle base.

3. A repair tool for inserting repair material into pneumatic structures such as tires and the like, comprising: an elongated container of hollow construction, at least two storage means proportioned to fit slidably within said container and having repair material coiled therein in a continuous length, a combination needle-and-needle base which is located at the open end of said canister and is reversible whereby said needle is disposed interiorly or projects exteriorly of said canister, means for guiding the withdrawal of said repair material as it is threaded and dispensed through said needle during repair operation, a locking ring for retaining said needle base in the open end of said canister and thereby retaining the contents of said canister and positioning said combination needle-and-needle base, each of said storage means being comprised of a cylindrical transparent member, said containers being disposed in end-to-end relation and re-positionable whereby as each container is exhausted, a replacement container can be disposed in dispensing position.

4. A repair tool for inserting repair material into pneumatic structures such as tubeless tires and the like, comprising: an elongated container of hollow construction, at least two storage means proportioned to fit slidably within said container and having repair material coiled therein in continuous length, a combination needle-and-needle base which is located at the open end of said canister and is reversible whereby said needle is extended interiorly or projected exteriorly of said container, means for guiding the withdrawal of said repair material as it is threaded and disposed of through said needle during repair operation, a locking ring for retaining said needle base in the open end of said canister and thereby retaining the contents of said canister and positioning said combination needle-and-needle base, each of said storage means being comprised of a cylindrical transparent member, said storage means being disposed in end-to-end relation and re-positionable whereby as each transparent member is exhausted, a replacement storage means can be disposed in dispensing position, the base of said needle-and-needle-base being proportioned to fit within the open end of said canister and press fitted therein to form a cover which retains said container means within said canister and includes a plurality of webs which are dimensioned to form an interference fit with the interior surface of the open end of said canister.

5. A repair tool for inserting repair material within the injuries of tubeless automobile tires comprising: a canister having a hollow interior, a plurality of storage means each having a continuous length of repair material therein and slidably received within said canister, said storage means being selectively locatable within said canister whereby the uppermost one is in dispensing position and is selectively replaced with other ones of said repair storage means as the repair material is exhausted, a removable end member which is dimensioned to be press fitted within the end of said container and having a needle projecting therefrom, said end member being reversible whereby the needle extends within said container or projects from said container, and an end cap threadedly connected to the end of said container for clamping said closure member within the open end of said container.

6. A repair tool for effecting repairs in pneumatic pressure containing bodies, comprising: a canister, a plurality of cartridges, each having coiled therein a continuous length of repair material and from which repair material can be drawn in continuous lengths, said cartridges being arrangeable in longitudinal order whereby the uppermost one of said cartridges is furnishing the repair material, a combination needle-and-needle base, said needle base being proportioned to press fit within the open end of said canister whereby the needle is extended within said canister in a storage position or is projected from said canister when the needle base is reversed, said cartridges having aligned openings through which the needle is passed when in its storage position, and a locking ring threadedly connected with the open end of said canister and engaging said needle base to clamp it within either of its reversible positions and for retaining it at either position during storage or operation.

References Cited by the Examiner
UNITED STATES PATENTS 908,708 1/1909 Stewart _____ 223—104
3,110,205 11/1963 Humphreys et al. _____ 81—15

WILLIAM FELDMAN, *Primary Examiner.*
OTHELL M. SIMPSON, *Examiner.*